United States Patent [19]
Richie

[11] 3,738,524
[45] June 12, 1973

[54] PLASTIC COVERED GLASS CONTAINER

[75] Inventor: Carlton A. Richie, Toledo, Ohio

[73] Assignee: Owens-Illinois, Inc., Toledo, Ohio

[22] Filed: Mar. 31, 1971

[21] Appl. No.: 129,691

[52] U.S. Cl................................. 215/12 R, 215/40
[51] Int. Cl............................................ B65d 41/04
[58] Field of Search.......... 215/12 R, 38 A, DIG. 6; 229/DIG. 12

[56] References Cited
UNITED STATES PATENTS

| | | | |
|---|---|---|---|
| 2,565,954 | 8/1951 | Dey | 215/12 R |
| 2,610,940 | 9/1952 | Endicott | 215/12 R UX |
| 3,358,902 | 12/1967 | Emmert | 215/38 A X |
| 3,083,854 | 4/1963 | Lusher | 215/12 R X |
| 2,568,371 | 9/1951 | Seaver | 215/12 R |
| 3,235,112 | 2/1966 | Fillwalk | 215/38 A UX |
| 1,969,453 | 8/1934 | Churchill | 215/38 A X |
| 2,090,320 | 8/1937 | Amick | 215/12 R |

FOREIGN PATENTS OR APPLICATIONS

| | | | |
|---|---|---|---|
| 757,591 | 10/1933 | France | 215/12 R |

*Primary Examiner*—Donald F. Norton
*Attorney*—J. R. Nelson and E. J. Holler

[57] ABSTRACT

The invention disclosed relates to a plastic coated glass container. A wide variety of glass bottles or jars have a covering of shrinkable plastic material shrunken over a selected region of the glass wall. The covering may be first pre-decorated or pre-printed while in a flat form. The covering may be a seamless tube or a sheet wrapped on a mandrel cylinder to a continuous (endless) sleeve form that is telescopically inserted over the bottle encircling the area to be covered. The lower marginal end thereof will overhang the bottom end of the bottle. The sleeve may be of a pre-foamed or non-foamed plastic material, opaque, pigmented or transparent. It is shrunken in situ by heat so that it fits snugly on the bottle surface and conforms to the container wall about its shoulder, body, heel and its bearing surface at the bottom end of the bottle to provide: (1) a body covering protecting the glass against surface damage, (2) a pre-printed label or decoration for the bottle, and (3) a plastic covering on the lower end bearing surface protecting those areas from damage; and further providing sufficient protection for the glass to eliminate carton partitions, dividers or the like currently used.

1 Claim, 13 Drawing Figures

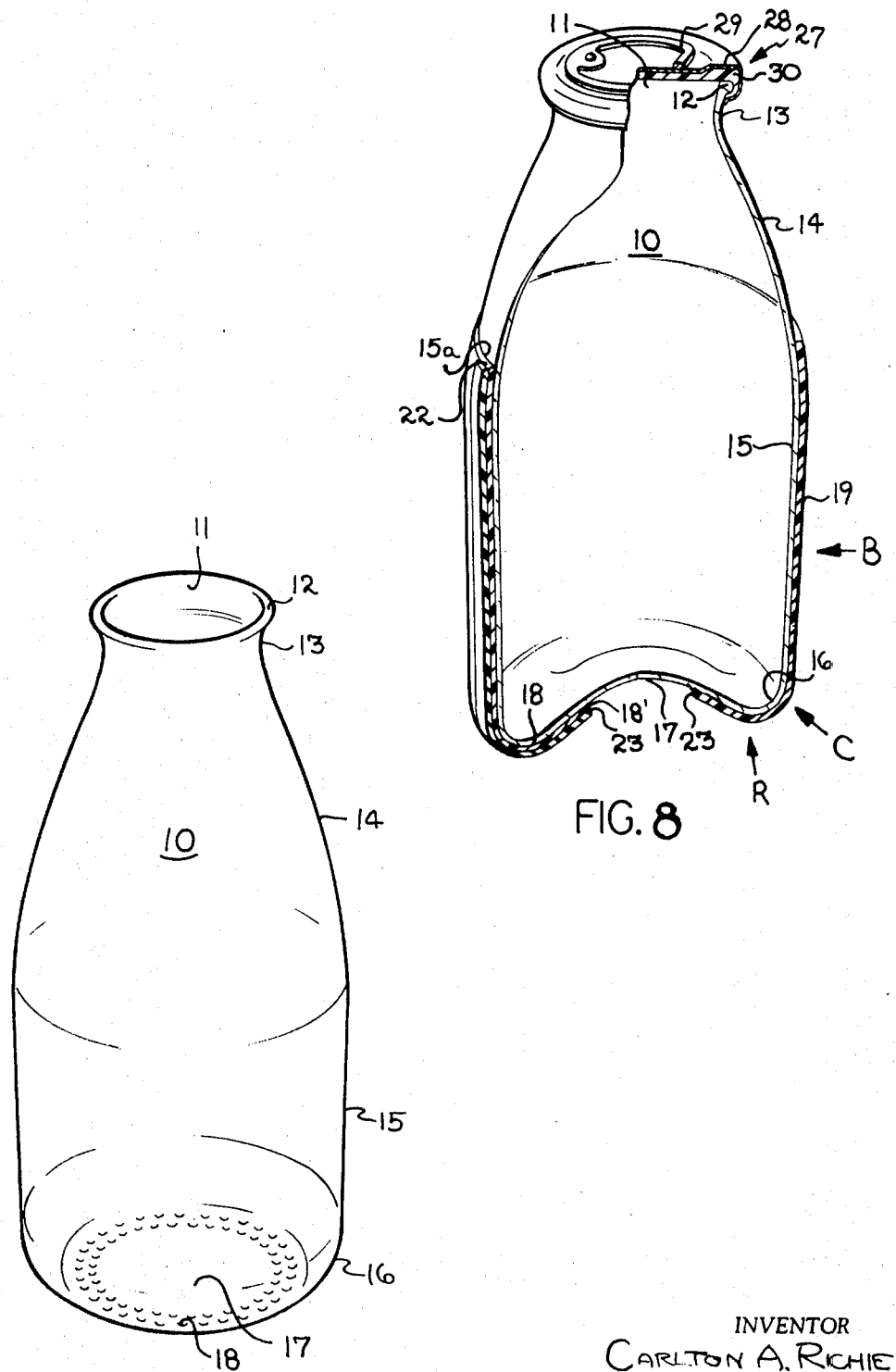

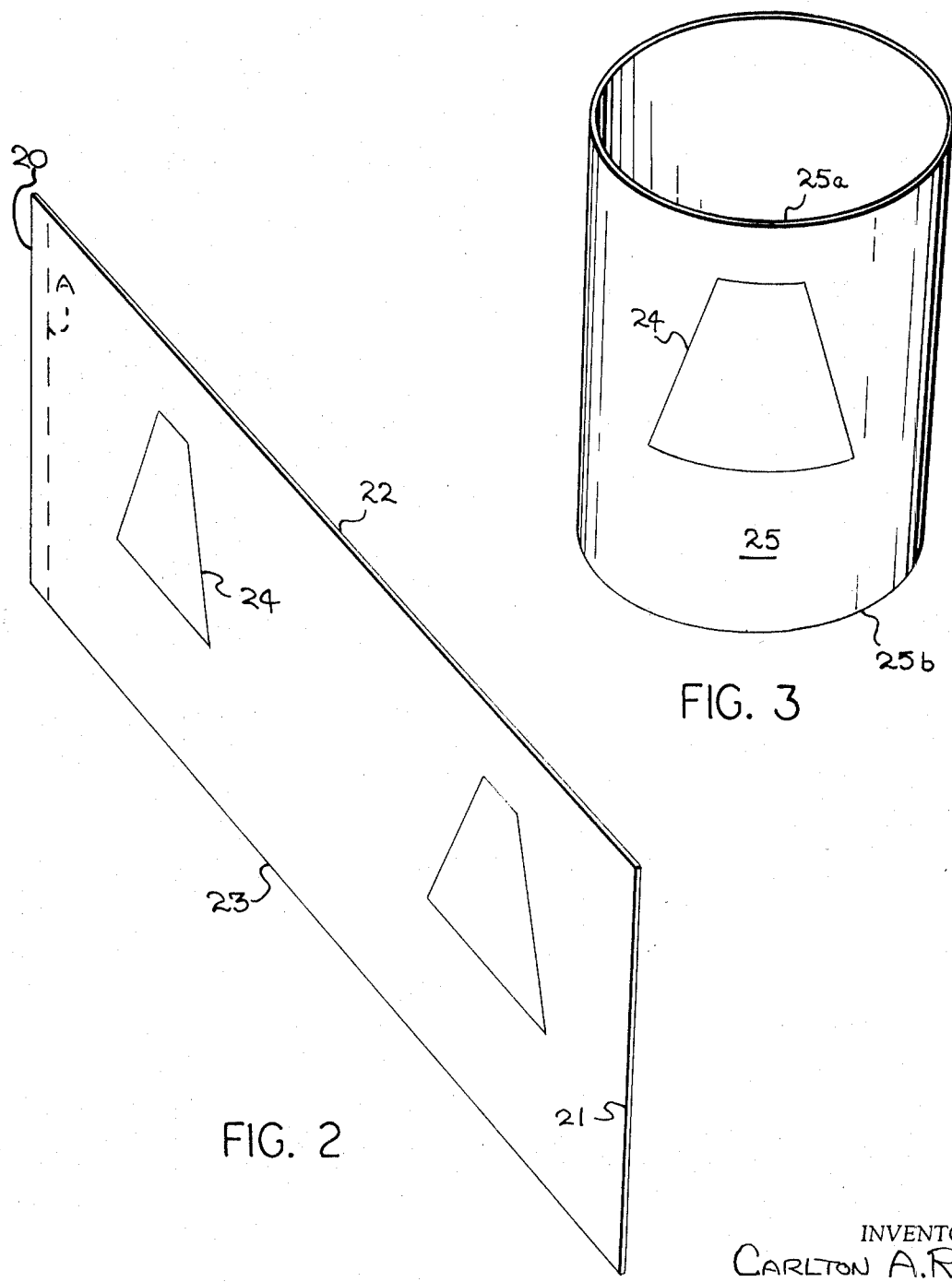

PATENTED JUN 12 1973

INVENTOR.
CARLTON A. RICHIE
BY J. R. Nelson and
E. J. Haller
ATTORNEYS

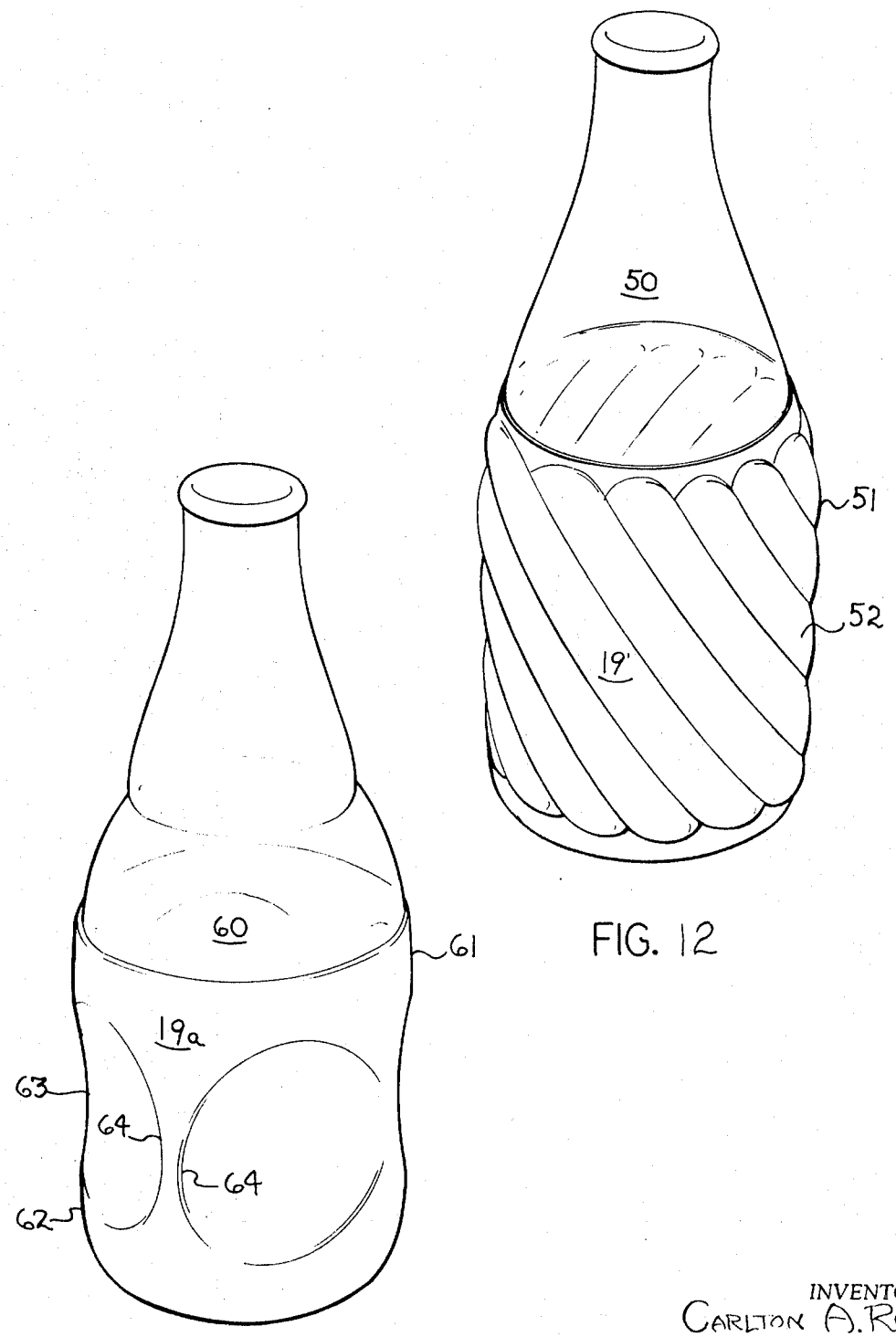

PLASTIC COVERED GLASS CONTAINER

DESCRIPTION

The invention relates to an improved glass container providing exceptional functional advantages of strength, preservation of the glass, aesthetic appearance, manufacturing convenience, ease in labelling or decorating, and ware protective coating that will eliminate the need for carton partitions in handling the containers.

BACKGROUND OF THE INVENTION

In the present art of glass containers, several expedients have been employed to preserve the pristine strength of the outer glass surface of the bottle. Among these are various transparent spray coatings of metal oxides, such as titanium, tin or like compounds, which pyrolize and form a thin invisible coating to prevent surface abuse of the glass. Other transparent organic coatings have been provided to similarly avoid surface scratches or abrasions of the bottle exterior in handling after the bottle is manufactured. These coatings in part attempt to impart a lubricity to the glass — make it less tacky or abrasive — so that upon contact with other containers or objects less abrasion may result. However, in the various coatings applied to the newly formed bottles there are certain attendant problems. Among these are difficulty in labelling, such as with adhesively applied paper or foil labels, and difficulty in determining whether an adequate coating has been applied.

A recent innovation for overcoming the foregoing problems in the container industry is disclosed in U.S. Pat. No. 3,482,724 in which a composite container provides a base element secured to the glass to provide a coating for the lower portions of the glass eliminating glass-to-glass contact at the major diameter, provide a pre-labelled base fitment on the container, and, characteristic of that container, the base provides stable "no-mar" bearing support for the package.

SUMMARY OF THE INVENTION

In the present container of this invention, a bottle providing the product storage compartment or envelope has applied thereto a unique sheath or sleeve covering that may be predecorated or labelled by high speed, high quality "flat" printing, is inexpensive to make and apply and provides body protection for the container against abrasion or surface damage and, if desired, a bottom bearing ring support.

The invention includes the preferred form of sleeve that in its finished form is tightly engaging onto the bottle constructed of glass susceptible to surface damage and abrasion in lessening its strength.

In another form of the invention, the sleeve composed of a pre-foamed, shrinkable material is applied to provide a light weight, cellular but relatively thick cushion of protection to the glass, thereby adding further protection.

Another important feature of the invention is the provision of a plastic sleeve of shrinkable thermoplastic material, formed from a rectilinear blank of sheet material and wrapped circumferentially on a cylindrical mandrel such that the opposite ends of the blank overlap for forming a lapped seam. Heat and pressure is applied in the overlap areas to seal the seam and compress the material thereby reducing the thickness of the overlapping layers to be substantially that of the single thickness layer of the remainder of the sleeve. This offers a strong connection for the ends of the blank in forming the sleeve yet is an attractive and functional covering upon shrinking the sleeve to conform to the bottle.

In another form of the invention, the plastic sleeve of shrinkable thermoplastic material is a seamless, continuous tubing shape that is highly oriented in the transverse direction only (circumferentially) and may be most advantageous with thinner films that are either colored, opaque or transparent.

An additional feature of the invention resides in the wall to wall protection of glass containers when handled or transported in a carton. Heretofore, glass bottles are conventionally placed within cells formed by criss-cross partitions or dividers in the carton. The partitions are cut or sawed from sheets of corrugated paper, and paper dust or fragments (called "carton dust") often accompany the dividers into their placement in the carton. During shipment of the empty containers in the carton from the bottle manufacturer to the bottle user, this carton dust enters the bottles. The carton dust problem causes the user added cost and handling to remove any of this foreign matter before filling. By the use of the bottles of this invention, carton partitions or dividers may be eliminated, which results in a saving of material in the carton and, just as important, eliminates the attendant carton dust problem.

In one form of the invention, the so-called "insect infestation" problem in packages of certain foods is obviated. The packaging of baby food is conventionally in glass jars closed by lug-type screw cap and bottle finish. The lower skirt edge of the cap on the baby food jar provides an undercut peripheral area between the skirt and glass finish whereat during shelf life, etc. insects may be attracted to lay eggs, hatch larvae, etc. Since the food is packaged under vacuum, the loosening of the closure creates a sudden rush of air over this area and into the jar, carrying the unsightly, insect contaminant into the food. The present invention eliminates this problem. The shrinkable plastic sleeve is assembled onto a food container, such as a baby food jar, to form the upper edge perimeter of the plastic covering at an elevation that will be in firm contact with the skirt edge of a screwed-on closure. By there being an overlap between the skirt edge and the shrunken plastic covering on the jar, the area of the former insect problem is now advantageously filled with the plastic of the jar covering. In an alternative fashion, if the shrunken plastic covering may be put on the jar after it is closed, the upper peripheral margin of the covering may be shrunken into an outer lapping relationship to the skirt peripheral lower edge and thereby completely seal off the juncture space between closure and glass; and, additionally, provide a tamperproof feature to the package.

The present invention, in the various embodiments herein presented, provides for a variation in body wall coverage that ranges in the minimum sleeve that extends from the major diameter in the body of the bottle into the bottom end to the maximum sleeve that extends from the mouth finish, whether or not externally overlapping a closure, into the bottom end. Thus, in the bottle design, the best overall container from the standpoint of appearance, decoration and function — with safety and strength a major consideration — is selected to provide the new and improved container of the invention suitable for the product to be packaged. The preferred body coverage of the sleeve on the bottle will include coverage of the larger diameter cross-sectional regions, usually occurring in the shoulder and near the heel of the bottle.

Several other attendant objects and advantages of the invention will become apparent to those skilled in the art from the descriptions and drawings of the invention, as will presently appear.

In this disclosure, the terms "glass container" and "bottle" and "jar" are each intended to mean a structure for a product chamber or vessel defined by a glass wall that includes a mouth opening for access to the chamber. The mouth is closed by a closure device to enclose product in the vessel.

The invention is adaptable to round, oval, square, ribbed, wide mouth, narrow neck, crown finish, screw or threaded finish, lug finish, or many other special designed shapes of glass containers.

BRIEF DESCRIPTION OF THE DRAWINGS

FIG. 1 is a front perspective view of a glass bottle illustrative of one form of the invention.

FIG. 2 is a front perspective view of a flat form of the pre-decorated blank of plastic to be wrapped about a mandrel and seamed for covering the bottle of FIG. 1.

FIG. 3 is a front perspective view of a seamless form of pre-decorated blank of plastic for covering the bottle of FIG. 1.

FIG. 8 is a partly broken, sectional perspective view of a plastic covered, glass bottle of FIG. 7, and having a closure thereon.

FIG. 12 is a front perspective view of a further form of the invention illustrating irregular bottle surface-shape design and the applied plastic covering thereon.

FIG. 13 is a front perspective view of a still further form of the invention illustrating another glass bottle having an irregular surface configuration and square-like shape, the plastic covering applied thereon being apertured between the enlarged shoulder and heel regions of the bottle.

DESCRIPTION

Figure 4:
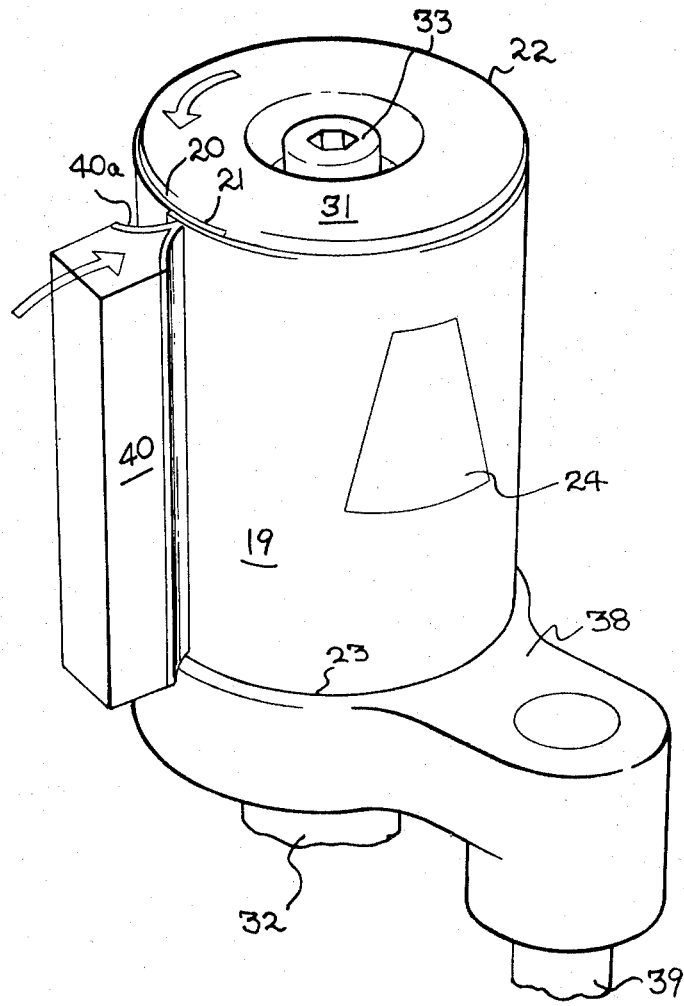
FIG. 4 is a schematic view of the apparatus for forming the pre-printed flat blank to a sleeve form and heat-sealing the overlapping ends to a seamed sleeve.

With reference to FIG. 1, a glass bottle 10 has a mouth opening 11 defined by a finish rim 12 at the top end of the inwardly tapered neck 13. The neck 13 blends with the outwardly tapering shoulder 14 that is contiguous with the cylindrical body portion 15. Body 15 represents a straight-sided, cylindrical portion having the major or maximum diameter (major circumference 15a) of bottle 10. The lower reach of body 15 describes a relatively large corner radius 16 blending into bottom and 17 of bottle 10. Preferably, corner radius 16 is relatively large to provide a curvature adjacent the bottom end of the bottle. The usual design of bottle 10 provides that end 17 is slightly concave surface such that an annulus portion of end 17 supports bottle 10 on a flat horizontal surface. This annulus region is shown in FIG. 1 as the stippled area 18.

A sleeve 19 of a plastic material is assembled to the bottle 10 in a manner to be presently described. In one form, the sleeve 19 is preferably formed from a rectangular sheet of heat shrinkable plastic material (FIG. 2) having opposed marginal ends 20 and 21 that are overlapped and seamed. In this illustrated embodiment of the invention, the dimension of ends 20, 21 is selected such that it is slightly greater than the distance from above the body portion 15, around bottom corner 16 to a point at about the inner edge of the recessed bottom area 18 (see FIG. 8). The sleeve 19 is formed as substantially a hollow cylinder with a lapped seam joint, i.e., edges 20, 21 overlap each other, and these ends are heat sealed together in a manner to be described. The sleeve is telescopically moved over bottom end 17 of bottle 10 until the upper marginal edge 22 extends above the upper extremity of body 15 of the bottle (FIG. 1). In this relationship of assembly, the bottle 10 and sleeve 19 are placed in a heated atmosphere of sufficient temperature to shrink the plastic material and there retained to shrink sleeve 19 from its annular shape to a tight bottle conforming shape extending from the lower marginal edge 23 (FIG. 8) to the upper marginal edge 22.

The sleeve 19 is formed as a blank cut from flat sheet stock of shrinkable plastic sheet material, as in the form shown on FIG. 2, and has a decorative image 24 of preselected design printed on one face of the sheet blank between the ends 20, 21. Printing may be applied by any suitable method, color or design adaptable to the sheet material and such printing of design image may be done while the sheet of material is a supply web, i.e., before the sleeve blank 19 is formed to size, or the formed blanks 19 may be made in a sequence and then printed. Alternatively, no printing or image need appear on the blanks 19, however, one of the decided two-fold advantages of the sleeve 19 in the assembly of the composite container of this invention is the provision of decoration for the container that is printed separately of handling the container and thereby achieve a cheaper, yet more desirable and higher caliber decoration plus the cost of extra handling of the bottle in applying a decoration is avoided.

Referring to FIG. 3, another form of the plastic sleeve covering is disclosed. In this form, a seamless, tubular length of plastic 25 is cut to the desired length between end margins 25a and 25b. Before cutting the lengths of plastic tube 25, a supply of the tubular seamless plastic of the proper diameter is highly oriented in the circumferential or transverse direction by stretching the tube diametrically just after extrusion. No stretching should be provided in the axial dimension so that the resultant plastic tube is mono-axially oriented. The tube supply may be collapsed or flattened and provided with a desired printing or decoration 24. Thereafter, most conveniently, the lengths of tubing 25 are cut and placed over container 10. The tube sleeve 25 is placed to extend below the end of bottle 10 in the same manner as illustrated on FIG. 5 and thereat shrunken onto the bottle.

Although it is not shown in the drawings, it is further possible under the invention to provide a pre-decorated bottle with a dense, opaque decorative image on its surface, such as at body surface 15 (FIG. 1) and apply to it a heat shrinkable sleeve of either form 19 or 25 of transparent or somewhat translucent material of the type contemplated so that the image of the decoration may be viewed through the sleeve. In this manner, the sleeve serves as a protective covering for the decoration on the bottle body 15 as well as protective for the bottle 10 itself against exterior abuse and abrasion of the glass wall.

In the last described alternate from of the invention, the container may more readily serve as a "returnable bottle" for service through several trips in packaging beer or beverage products. The protection afforded the decoration and the bottle by the plastic sleeve will enhance the life of the bottle through handling, filling, capping, processing, shipping to market and handling of the consumer, and return to the bottler and his recycle usage involving washing and the rinse steps in the several repeat trips for delivery of product to consumers.

An important design criteria in the present invention is the selection of the surface areas that the plastic sleeve is to cover on the bottle. Several examples of this are shown on the drawings.

By extending the sleeve on the bottle to just above the top of the body 15 of bottle 10 or above the uppermost major diameter of bottle 10 and onto the neck portion the largest annular sections of the bottle are protected from side or bottom end contact with the surrounding surfaces, i.e., a floor, a table top, an adjacent bottle or stationary vertical guides and the like. As seen on FIG. 8, the neck and finish is covered by a closure member 27 in end use, and this member absorbs shock of impact thereat.

To illustrate this point further, it is important that at least the region adjacent the enlarged or laterally bulged diametrical regions of the bottle and the lower end bearing surface be covered with the plastic. The various container designs on the drawings illustrate this more specifically. In the container shown on FIg. 1, these regions are in the shoulder region at the top end of body 15, at the heel region 16 and on the annular bearing surface 18 on the bottom end of bottle 10. On the container shown on FIg. 9, the regions are at shoulder 37, heel 43 and bottom end bearing surface 44. In the container 45 shown on FIG. 11, the regions are at shoulder enlargement 47, enlarged lower side wall 48, heel 49 and bottom end surface portion 53. On FIG. 12, the protection of the plastic is needed at the apex of the ribs 52 and the bottom end bearing surface of container 50. On FIG. 13, protection of regions at shoulder bulge 61, heel bulge 62 and the bottom end of container 60 are important.

The closure 27 shown on FIg. 8 comprises an outer metal cap 28 of aluminum that may include a ring pull convenience opening device 29 attached to a prescored tear strip in the top panel of the cap and extending into the side or skirt. Underlying cap 28 is a sealant or gasket member 30 of an elastomeric material, such as polyethylene. The gasket 30 annularly surrounds the finish 12 of bottle 10 and in the preferred form shown extends across mouth opening 11 of the bottle. The particular finish 12 is not a part of this invention and, therefore, any known bottle finish may take the place of the finish 12 shown on the drawings, for example the crown finish on FIG. 11 or the screw-lug finish on FIG. 9. In the closure illustrated, the outer cap is crimped tightly onto bottle finish 12 and seals the closure against the finish and along the sloping neck 13 of the container. The gasket 30 of the closure is thus designed in the embodiment described to provide a seal of the closure on the container finish.

Figure 9:
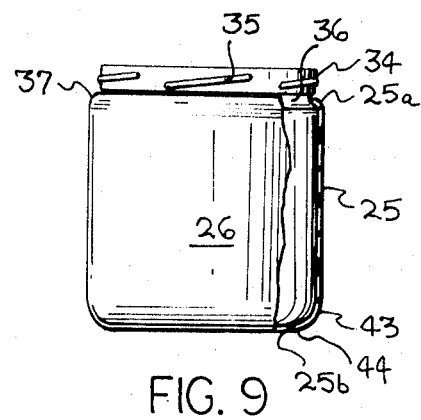
FIG. 9 is an elevational view, partly broken away, of a food container adapted with the plastic covering of the invention, illustrating another form of the invention.
Figure 11:
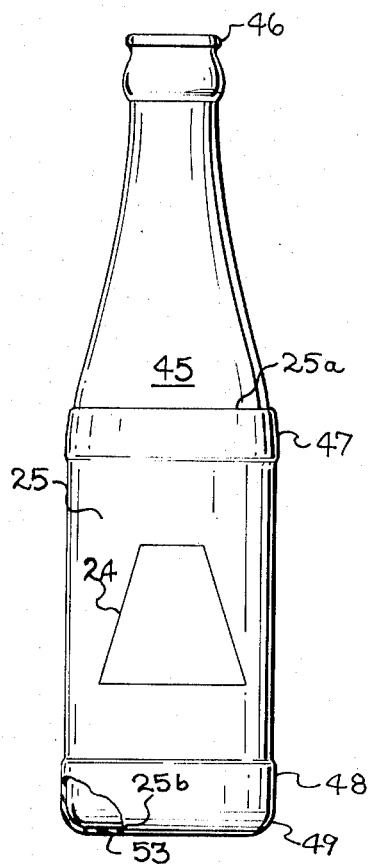
FIG. 11 is a front elevational view illustrating another form of the invention.
Figure 10:
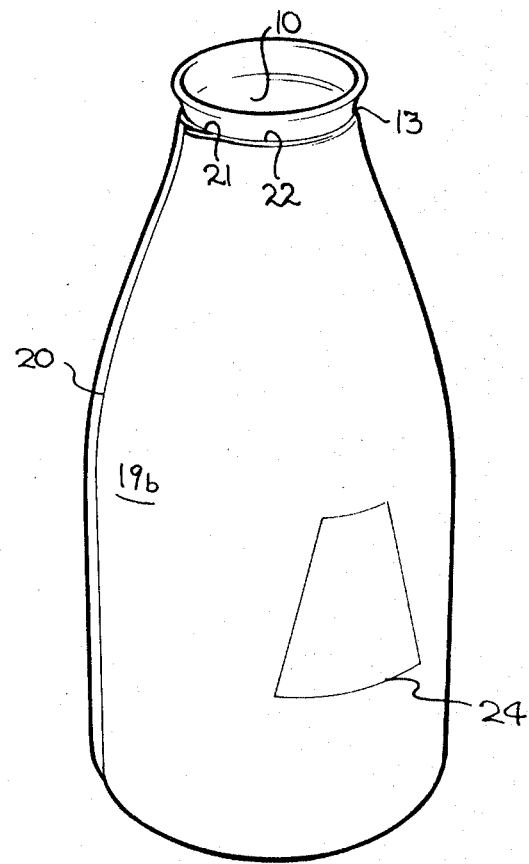
FIG. 10 is a front perspective view of a further form of the invention showing a full height sleeve on a glass bottle.

Other important features are involved with the bottles on embodiments illustrated by FIGS. 9-11.

The container on FIG. 9 represents a glass baby food jar 26, a wide mouth container. The jar has the lug type screw neck finish 34 including raised helically located, raised lugs 35. Below the finish is a thin cylindrical neck region 39. The glass wall of jar 26 extends radially to the shoulder 37 at a radius and the side wall is cylindrical of about the same diameter as shoulder 37. At the bottom end of the jar is heel region 43 adjacent the relatively large radius that joins with the bottom bearing surface 44. The plastic sleeve 25, for example, is applied to the jar in accordance with the invention and is selected of an axial length dimension in the blank (FIG. 3) from end 25a to end 25b so that the top edge 25a extends somewhat above shoulder 37 of jar 26 and the bottom edge 25b extends below the plane of bottom end 44 of the jar. Upon shrinking the tubular plastic blank 25, the plastic snugly covers the glass of the cylindrical neck region 36 and along the wall of the jar over the heel radius at 43 and onto the bottom end wall 44. At the time the screw closure (not shown) is applied to the jar, the lower annular edge of the cap skirt is tightened to bite into the plastic covering 25 along the radial extent adjacent cylindrical wall 36 and seal off the lower edge of the cap (not shown) against foreign matter or insects infesting the under side of the lower cap skirt between it and the cylindrical glass wall. The other protection objectives, just described, against contact or abuse at the larger diameter body regions and the bearing lower end support are also covered with plastic of the sleeve 25. Either the seamless sleeve 25 or seamed sleeve 19 may be employed for this purpose.

On FIG. 10, the entire side wall of bottle 10 and the lower end bearing surface are covered by plastic sleeve 19b. This illustrates a full height sleeve embodiment of the invention. The sleeve 19b is applied to the bottle 10 such that after it is shrunken, the sleeve extends from the neck region 13 around the heel of the bottle and onto the bottom end. The full height sleeve of this embodiment is shrunken into snug fitting engagement with the bottle wall by the treatment described herein.

On FIG. 11, the narrow neck bottle 45 having a conventional crown finish 46 includes a rather long neck sloped downwardly and outwardly merging into bulged shoulder 47. Below shoulder 47 is an inset cylindrical body joined with a lower, outwardly bulged heel region 48 having lower end radius 49 joining with bottom end 53 at the annular bearing surface. A seamless sleeve 25, for example, is shrunken over the glass bottle 45 from just above the tapered lead in to shoulder 47, along the inset of the cylindrical body, over bulged heel 48, corner radius 49 and onto the lower end annular bearing surface 53. Besides providing the glass protection pointed out earlier herein, this embodiment supplies a label or decoration 24 on the sleeve 25 over the inset body region of bottle 45 between the bulged portions 47 and 48.

In the embodiments of FIGS. 9 and 10 wherein nearly total coverage of the glass wall of jar 26 and bottle 10 are provided, should breakage of the container occur, up to 85 percent of the fragments of glass may be retained by the plastic sleeve covering. In the case of the FIG. 11 embodiment, up to 70 percent of the fragments of glass may be retained by the sleeve covering. This demonstrates an added safety feature to glass containers provided by the invention.

In relation to the above-described embodiments of the invention, the following are some examples of materials that are preferred for use.

The bottles such as 10, 50, 60, 45 or jar 26 are comprised of a soda-lime-silica glass composition well known in the bottle industry and may be formed by conventional molding practices.

The thermoplastic is made to provide mono-axial orientation of the sleeves 19 or 25. When the thermoplastic is first extruded and formed to a tubular film it is stretched corresponding to the direction transverse to the axis of the later formed sleeve a desired amount. Any stretch in the direction corresponding to the axial dimension of formed sleeve is to be avoided. The plastic utilized has mono-axial orientation to the best practical degree. The plastic may be pre-printed, if desired, for certain of the embodiments herein described. The printed plastic may then be cut to lengths that correspond to the height dimension, for example the length of sides 20, 21 of blank 19 (FIG. 2). It is important that the orientation of the stretch of the film and ultimate shrink reaction be along the length of the blank sides 22, 23, or in the circumferential dimension of blank 25.

The density and wall thickness of foamed thermoplastics is controllable in the initial sheet or film processing. It can also be controlled in post-forming applications. For example, polystyrene sheet can be made to as much as 65 lb. per cubic foot density range, depending upon desired end use. Post heated foamed plastic may further expand as it shrinks around the container, and this will lower the end density of the material on the container.

In the case of sleeve 19, after slitting to the height dimension the pre-printed plastic strips may be stored as rolls. The preprinted rolls are then fed to a cutter forming the individual blanks 19 shown on FIG. 2 having sides 20, 21 and are formed or cut to the dimensions 22 and 23. The blanks 19 are fed to a mandrel 31 as shown on FIG. 4.

EXAMPLE I

The blanks are formed of foamed plastic material having the mono!-axial orientation shrink property. Examples of plastics are: copolymers of carboxylic acid containing monomers with ethylene which is sold in one form under the trade name "Surlyn", medium or low density polyethylene, polypropylene, polystyrene, polyvinyl chloride, to name a few of the available plastic materials. The preferred thickness of the foamed plastic is in the range of 0.01 to 0.10 inches.

In practice, it has been found that blanks as 19 made from foamed, mono-axially oriented polystyrene shrink sheet material of approximately 0.02 inch thickness and 15 lb. per cubic foot density are very suitable in utilizing the invention on glass beer and beverage bottles such as bottle 10, of the 10 to 12 fluid ounce capacity size.

EXAMPLE II

The blanks are formed from non-foamed plastic material having the mono-axial orientation shrink property. Similar plastic material given for Example I may be utilized. The preferred thickness of the film is in the range of 0.0025 to 0.007 inches, the thickness being selected in the interest of function of the sleeve covering and economy of the resulting container. In practice, a clear film of polystyrene monoaxially oriented film of approximately 0.005 inch thickness may be utilized for the sleeve covering on bottles 10 of the 10 to 12 fluid ounce capacity size.

Figure 5:
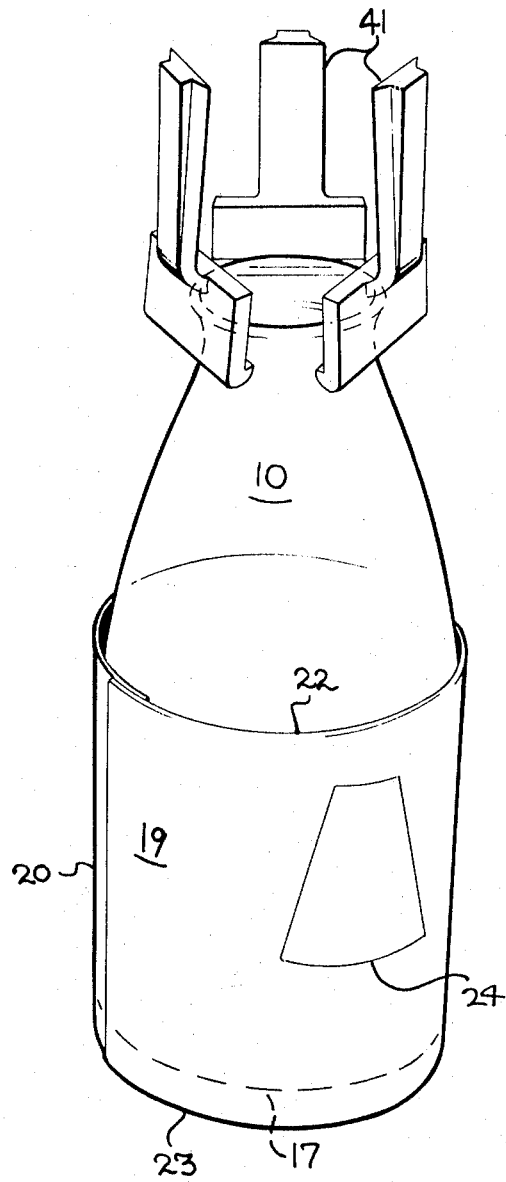
FIG. 5 is a perspective view of the bottle of FIG. 1 and plastic sleeve formed in accordance with FIG. 4 telescopically oriented prior to heat shrinking the plastic.
Figure 6:
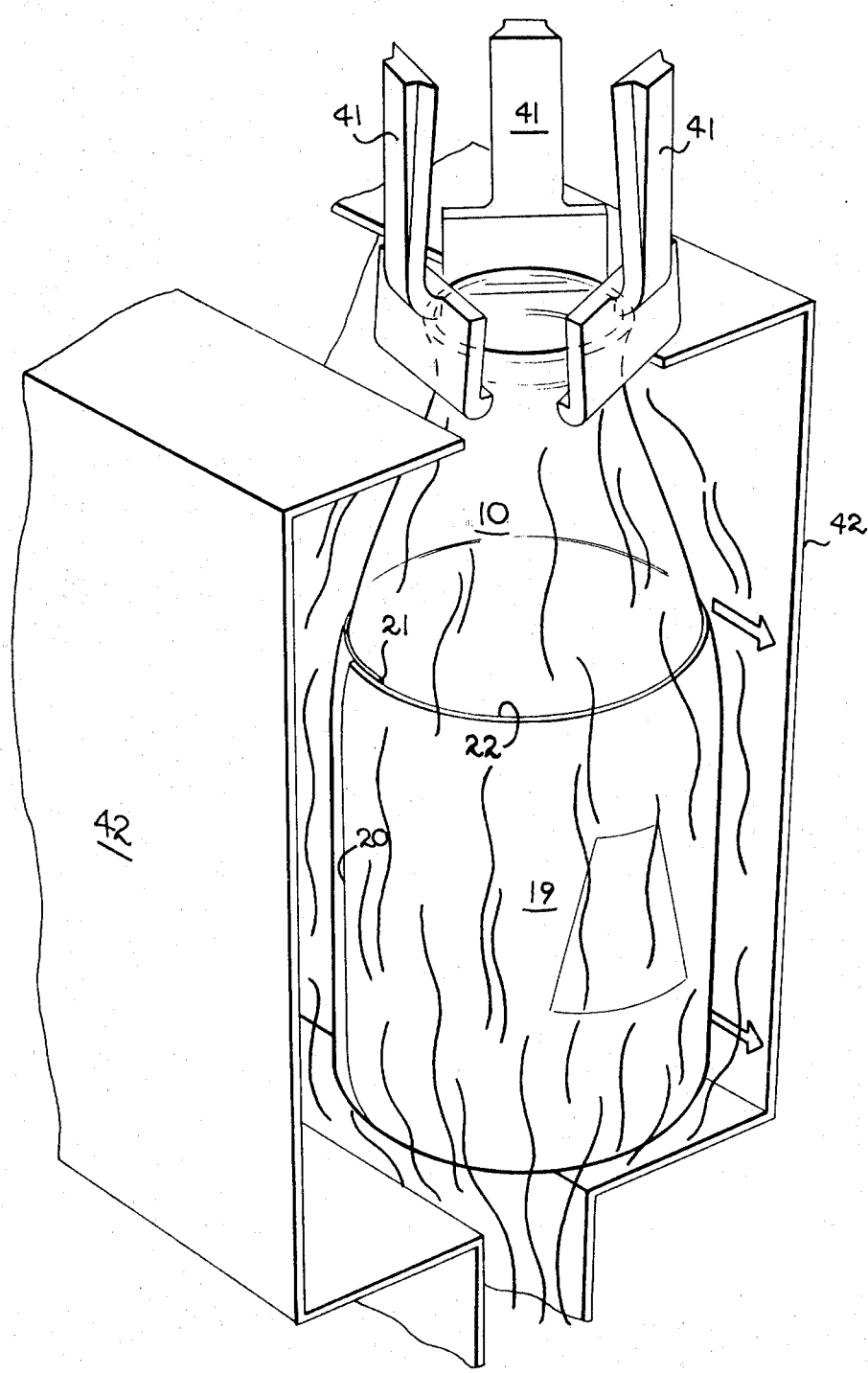
FIG. 6 is a perspective view of the bottle and sleeve assembly of FIG. 5 undergoing heat treatment.

In FIGS. 4–6, fabrication of the seamed sleeve covered container embodiment of the invention is disclosed. Sheet material, such as set forth by the above Examples, is cut to the shape of the blank of FIG. 2 for the sleeve 19 (in this case a rectilinear form), decorated with an image 24 — either before or after the blank cutting operation — and fed to a rotary mandrel head 31. Mandrel 31 is mounted on shaft 32 and held by collar 33. Shaft 32 is rotated and the blank 19 wrapped thereon with ends 20 and 21 overlapping, as shown on FIG. 4. The mandrel 31 is concentric with a stripper sleeve 38 carried on a bracket and vertical spindle 39 (FIG. 4). Stripper sleeve 38 is in its lowered position out of interference with sleeve 19. The mandrel is the desired size (diameter) in relation to the bottle 10 that is to receive the sleeve when finished.

As the mandrel wraps the blank so as to overlap the trailing edge over the leading edge, a lap-seam is formed either by heat and pressure or an adhesive, thereby bonding the overlapped regions of plastic together.

As seen in FIG. 5, bottle 10 is brought to axial alignment with sleeve 19 and the latter is telescoped with bottle 10. The sleeve is slightly larger in diameter than the larger or major bottle diameter and fits on the bottle.

FIg. 5 shows the position of sleeve 19 as it is initially assembled on bottle 10 such that the lower edge of sleeve 13 spaced below bottom end 17 on the order of one-half inch or a sufficient extent to form the shrunken plastic over the bearing ring on bottom 17 of bottle 10. Bottle 10 with sleeve 19 initially assembled is suspended from transfer tongs 41 which transport the assembly 10, 19 into and through an oven 42.

Figure 7:
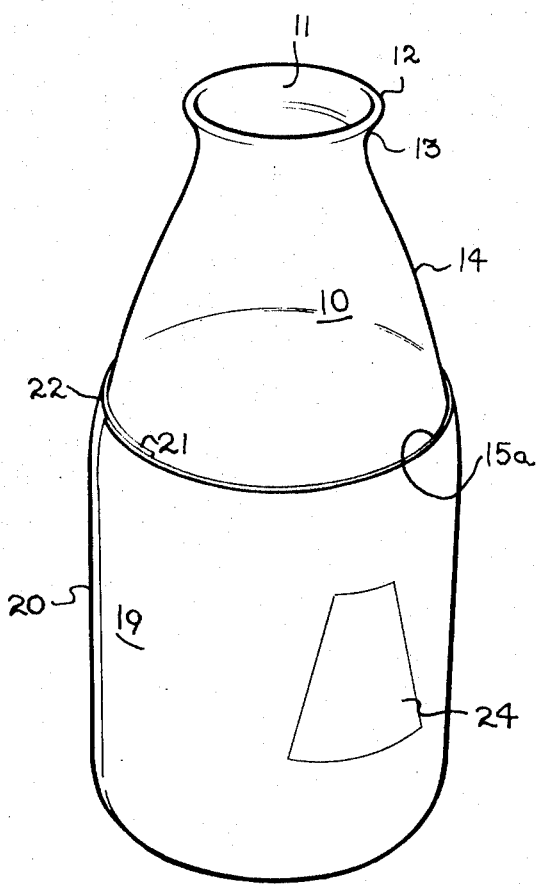
FIG. 7 is a front perspective view of the bottle and sleeve of FIG. 6 after the sleeve is heat shrunken into engagement with the bottle.

Oven 42 may be constructed as an elongated tunnel and heated air is circulated throughout the tunnel as the container is moved therein. The air temperature in the oven may be on the order of 400°F and sleeve 19 will shrink into snug fitting engagement with the adjacent surface of bottle 10 to form the finished container shown on FIG. 7.

The containers of the invention have been tested in the standard CONBUR IMPACT TEST. (ASTM, Part 15, April 1970, D–880–68, describes test.) A series of four-fifths quart round liquor bottles (water filled) were placed side by side in conventional cartons minus partitions or dividers. The bottles included sleeves like 25 (FIG. 3) thereon covering the wall area similar to FIG. 11. The sleeves were comprised of approximately 0.075 inch thick foamed or expanded polystyrene. The results of the test demonstrated the enhanced strength of the container of this invention and compared with cartons having partitions.

Other forms of the invention are shown on FIGS. 12 and 13. On FIG. 12, glass bottle 50 has a body portion 51 comprised of raised ribs or swirls 52. The sleeve blank 19' is a rectilinear form similar to the blank described earlier. The sleeve 19' is shrunken onto bottle 50 in the manner earlier described such that the sleeve has snug fitting engagement along the body wall 51 in the depressions or valleys on the bottle between the raised swirls. Throughout, sleeve 19' undergoes a relatively large extent of shrinkage such that the sleeve is reduced from its initial diameter, as formed on mandrel 31, to the varying diameters at the neck of bottle 50, the body thereof throughout the swirl 52 regions, at the heel curvature and onto the bottom end surface. This large extent of shrinkage reduces the sleeve into a snug conforming fit on the bottle, but without shrinkage in the height dimension 20, 21 of the blank.

FIG. 13 illustrates another form of irregularly shaped bottle 60 which includes a body portion that has a shoulder region 61. Shoulder 61 is a bulged portion of the bottle of major diametrical dimension. Near the lower end of the bottle is a similar major diameter bulged annular portion 62. Between shoulder portion 61 and lower raised portion 62 is a concave region 63 of lesser diameter. In essence, the body shape of the bottle just described is somewhat "hour-glass" shaped. The sleeve 19a thereon may be made to rectilinear form a blank from a sheet of a shrinkable or foamed shrinkable plastic material. The sleeve 19a is suitable for a bottle of hour-glass shape, as bottle 60, or a square shape or panel style bottle often used in certain product areas. In bottle 60, the areas shaded at 64 provide a pinched effect along the container wall and the sleeve 19a is shrunken into conforming, snug fitting relationship with the bottle side wall and end wall.

In practice of the invention, one skilled in the art will select suitable film or foamed thermoplastics of a diameter, length, width, density, surface hardness and thickness to provide efficient, economical and practical usage of the covering means on the bottle for product usage requirements and yet the end product package in the container having the features of this invention will be realized.

The minimum requirement of the invention is to provide glass bottle protection by means in annular thermoplastic shrink material for the so-called contact points of the bottle (the enlarged or bulged side wall portions) and the bottom bearing surface just inside and below the heel of the bottle. More extensive use of the covering means of the thermoplastic will provide further advantages of predecoration, coaster bottom, elimination of carton partitions and the attendant carton dust problem, elimination of insect infestation or foreign matter in vacuum packed containers, and lastly, but by no means least in importance, glass particle retention upon accidental breakage.

Other and further modifications may be resorted to without departing from the spirit and scope of the appended claims.

What is claimed:

1. In a vacuum packaged product, the combination of a wide mouth glass container packaging a product content including a neck portion having a mouth defined by a rim, the neck portion including a raised helical thread means on the glass exterior surface adjacent said rim providing a closure attaching element on the container, a shoulder portion below the closure attaching element, a cylindrical body portion below the shoulder portion, a heel portion at the bottom end of the body portion and a bottom portion including a bearing surface at the opposite end of the container, a shrunken thermoplastic covering layer in encircling fashion on the container that is shrunken thereon from a tubular, sleeve form and is of an axial dimension to extend in shrunken form from a location adjacent the lower extremity of the helical thread means on the neck portion and overlying the exterior glass surface of the shoulder, body, heel and bottom end portions of the glass container in a snug fitting engagement with said exterior glass surface portions, and a closure sealing the product content in the container, said closure having a top panel portion covering the mouth of the container and a circumferential downwardly extending skirt integral with said panel, screw threads on the interiorly facing surface of said skirt engaged on the helical thread means of said neck portion and tightened thereon so that the lower annular edge of the closure skirt bites into the thermoplastic covering layer on the glass shoulder surface adjacent said neck portion, thereby sealing the lower edge of the cap against penetration of foreign matter under the skirt of the closure.

* * * * *